United States Patent
Hattori

Patent Number: 5,998,904
Date of Patent: Dec. 7, 1999

[54] MOTOR

[75] Inventor: Makoto Hattori, Nishi-kasugai-gun, Japan

[73] Assignee: Mitsubishi Heavy Industries, Ltd., Tokyo, Japan

[21] Appl. No.: 09/106,350

[22] Filed: Jun. 29, 1998

[30] Foreign Application Priority Data

Jun. 30, 1997 [JP] Japan ................................. 9-187221

[51] Int. Cl.$^6$ ................................. H02K 1/00; H02K 1/12
[52] U.S. Cl. ........................ 310/216; 310/254; 310/258
[58] Field of Search ............................ 310/216, 217, 310/179, 180, 184, 185, 188, 194, 198, 254, 258, 259; 29/596, 598

[56] References Cited

U.S. PATENT DOCUMENTS

| | | | |
|---|---|---|---|
| Re. 26,179 | 3/1967 | Brammerlo et al. | 310/216 |
| 1,723,912 | 8/1929 | Bergman | 310/216 |
| 2,795,712 | 6/1957 | Suhr | 310/216 |
| 2,830,209 | 4/1958 | Fleckenstein | 310/216 |
| 3,062,976 | 11/1962 | Smith | 310/216 |
| 3,235,762 | 2/1966 | Brammerlo | 310/216 |
| 3,783,318 | 1/1974 | Widstand | 310/216 |
| 3,942,055 | 3/1976 | Hoffmeyer | 310/216 |
| 4,241,274 | 12/1980 | Brammerlo | 310/216 |
| 5,668,429 | 9/1997 | Boyd, Jr. et al. | 310/254 |

*Primary Examiner*—Nestor Ramirez
*Assistant Examiner*—Tran N Nguyen
*Attorney, Agent, or Firm*—Oblon, Spivak, McClelland, Maier & Neustadt, P.C.

[57] ABSTRACT

A motor comprises a stator 101 and a rotor 102, wherein the stator 101 has recesses (small-diameter sections) 107, 108 and large-diameter sections 103 and is formed with a plurality of slots that are circumferentially spaced and through which windings are passed, and the stator 101 has the relationship La<Lb wherein La represents the diametrical length of the slots 121 positioned circumferentially inside of said small-diameter sections 107, 108 and Lb represents the diametrical length of the slots 122 positioned circumferentially inside of said large-diameter sections 103.

3 Claims, 4 Drawing Sheets

MOTOR

BACKGROUND OF THE INVENTION

1. Field of the Invention

The present invention relates to a motor suitable for closed type electric compressors. The present application is based on Japanese Patent Application No. Hei 9-187221, the contents of which are herein incorporated by reference.

2. Related Art

One embodiment of conventional closed type electric compressors is shown in FIGS. 3 and 4.

A rotary compression mechanism 3 and a motor 100 for driving it through a crank shaft 4 are housed in a closed casing 1.

A stator 101 of the motor 100 is fixed by forcibly pressing it into the casing 1 and a rotor 102 is fixed to the upper part of the crank shaft 4.

The rotary compression mechanism 3 comprises a rolling piston 6 relatively rotatably fitted to a crank pin 5 of the crank shaft 4, a cylinder block 7 fixed to the casing 1 by welding, an upper bearing 8 for closing off an upper opening of the cylinder block 7, a lower bearing 9 for closing off a lower opening of the cylinder block 7, a blade 10 supported retractably in a slot 21 formed in the cylinder block 7, and a press spring 11 positioned behind the blade 10 for pressing the blade 10.

The crank shaft 4 is journaled in the upper bearing 8 and the lower bearing 9.

The rolling piston 6 is accommodated in a cylinder chamber 12 defined by the cylinder block 7, the upper bearing 8, and the lower bearing 9 and by abutting the tip of the blade 10 against the outer circumferential surface of the rolling piston 6, a suction chamber 13 is defined on one side of the blade 10 and a compression chamber 14 is defined on the other side.

When the crank shaft 4 is driven rotatably by the motor 100, the rolling piston 6 is rotatably moved eccentrically in the direction of the arrow in the cylinder chamber 12 and simultaneously therewith a gas is sucked into a suction chamber 13 through a suction pipe 20 and the gas in the compression chamber 14 is compressed.

The compressed gas is passed through a discharge port 22 formed in the upper bearing 8 to push up a discharge valve (not shown) and is introduced into a discharge muffler chamber 27 defined by the upper surface of the upper bearing 8 and a cover 26 covering it, where the pulsating component is removed.

Then, the gas enters, through a hole (not shown) formed in the cover 26, a first expansion chamber 28 defined below the motor 100, where it is expanded and the pulsating component is further removed.

Then the gas enters, through an air gap between the stator 101 and the rotor 102 and gas passages 29 formed between the stator 101 and the casing 1, a second expansion chamber 15 defined above the motor 100, where it is expanded and the pulsating component is further removed, and thereafter it is released into the outside through a discharge pipe 16.

A lubricating oil 17 is reserved in the bottom section in the casing 1 and is pumped up by a centrifugal oil pump 18 built in the crank shaft 4 to lubricate, for example, the sliding surfaces of the crank shaft 4, the upper bearing 8, and the lower bearing 9, the sliding surfaces of the crank pin 5 and the rolling piston 6, and the sliding surfaces of the rolling piston 6 and the cylinder 7 through a lubricating passage 19 formed in the crank shaft 4.

FIG. 5 is a transverse sectional view of the motor 100.

The rotor 102 is provided with a cylindrical core 111 comprising a plurality of layered laminations 110 that are composed of thin silicon steel sheets having the same size and the same shape, and a plurality of permanent magnets 115 are equi-spaced and embedded circumferentially along the outer circumference of the core 111.

The stator 101 is provided with laminations 104 composed of a plurality of thin silicon steel sheets having the same size and the same shape, and the laminations 104 are layered one on top of the other aligned with recesses 109 for auto-clamping, and are integrated by caulking to constitute a cylindrical core 105.

A plurality of slots 106 that have the same size and the same shape and are equi-spaced are formed circumferentially along the inner circumference of each lamination 104.

The outer periphery of each lamination 104 is formed with recesses 107 for the formation of the gas passages 29 and recesses 108 with which jigs for positioning will be engaged when the laminations 104 are layered and united together.

A plurality of windings 112 each covered with insulating paper 113 are passed through each slot 106 when the windings 112 are wound for the core 105.

When the stator 101 is forced into the casing 1, large-diameter sections 103 of each lamination 104 come in contact with the inner surface of the casing 1 and the recesses 107 and the inner surface of the casing 1 define the gas passages 29.

In the conventional motor 100, since the slots 106 formed in the laminations 104 of the stator 101 are the same in shape and size, the distance between the outer circumferential ends of the slots 106 positioned circumferentially inside of the recesses 107 and the recesses 108 that are small-diameter sections and the outer peripheries of the laminations 104, that is, the yoke length L, is shorter than that of the large-diameter sections 103, and therefore there is a problem that when electricity is passed to the windings 112, the magnetic flux passing through the yoke length L is decreased and hence the performance of the motor 100 is lowered.

DISCLOSURE OF THE INVENTION

The present invention has been made to solve the above problem and is directed to a motor comprising a stator and a rotor, wherein the stator has a small-diameter section and a large-diameter section and is formed with a plurality of slots that are circumferentially spaced and through which windings are passed, and the stator has the relationship La<Lb wherein La represents the diametrical length of the slots positioned circumferentially inside of said small-diameter section and Lb represents the diametrical length of the slots positioned circumferentially inside of said large-diameter section.

In conventional motors, La=Lb, the yoke length of slots positioned circumferentially inside of small-diameter sections is shorter than the yoke length of slots positioned circumferentially inside of large-diameter sections, whereas, in the present invention, La<Lb, and by selecting La and Lb suitably, the yoke lengths of slots can be made equal.

In the present invention, desirably a plurality of such small-diameter sections are formed circumferentially and approximately equi-spaced and the number of the slots positioned circumferentially inside of said small-diameter sections is equal to the number of the slots positioned circumferentially inside of said large-diameter sections. In that way, since the magnetic flux generated upon the passing of electricity through the windings can be distributed approximately uniformly throughout the stator, the performance of the motor can be improved.

EMBODIMENT

Figure 1:
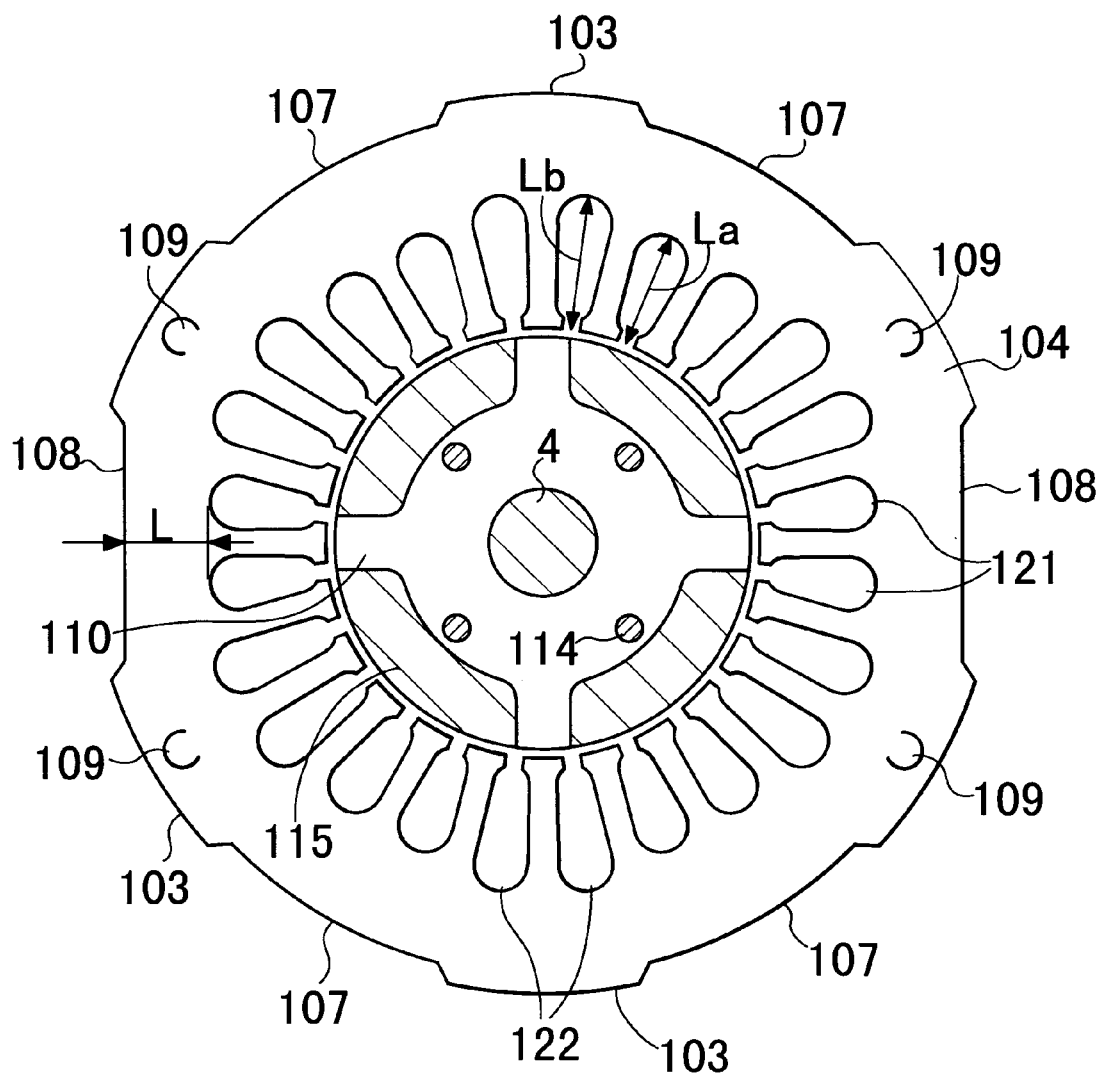
FIG. 1 is a traverse sectional view of the motor, showing an embodiment of the present invention.
Figure 2:
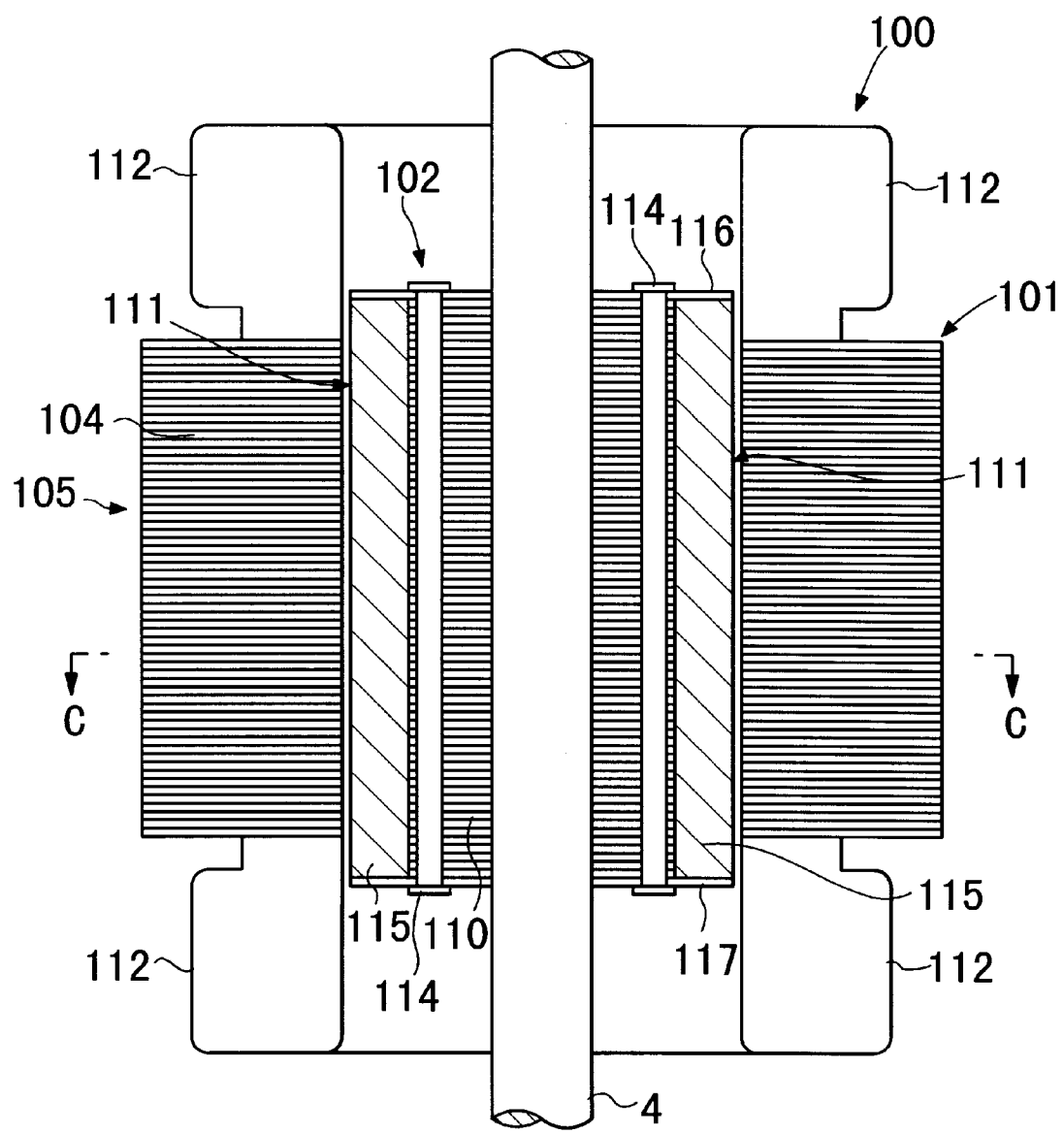
FIG. 2 is a vertical sectional view of the motor, showing the embodiment of the present invention.
Figure 3:
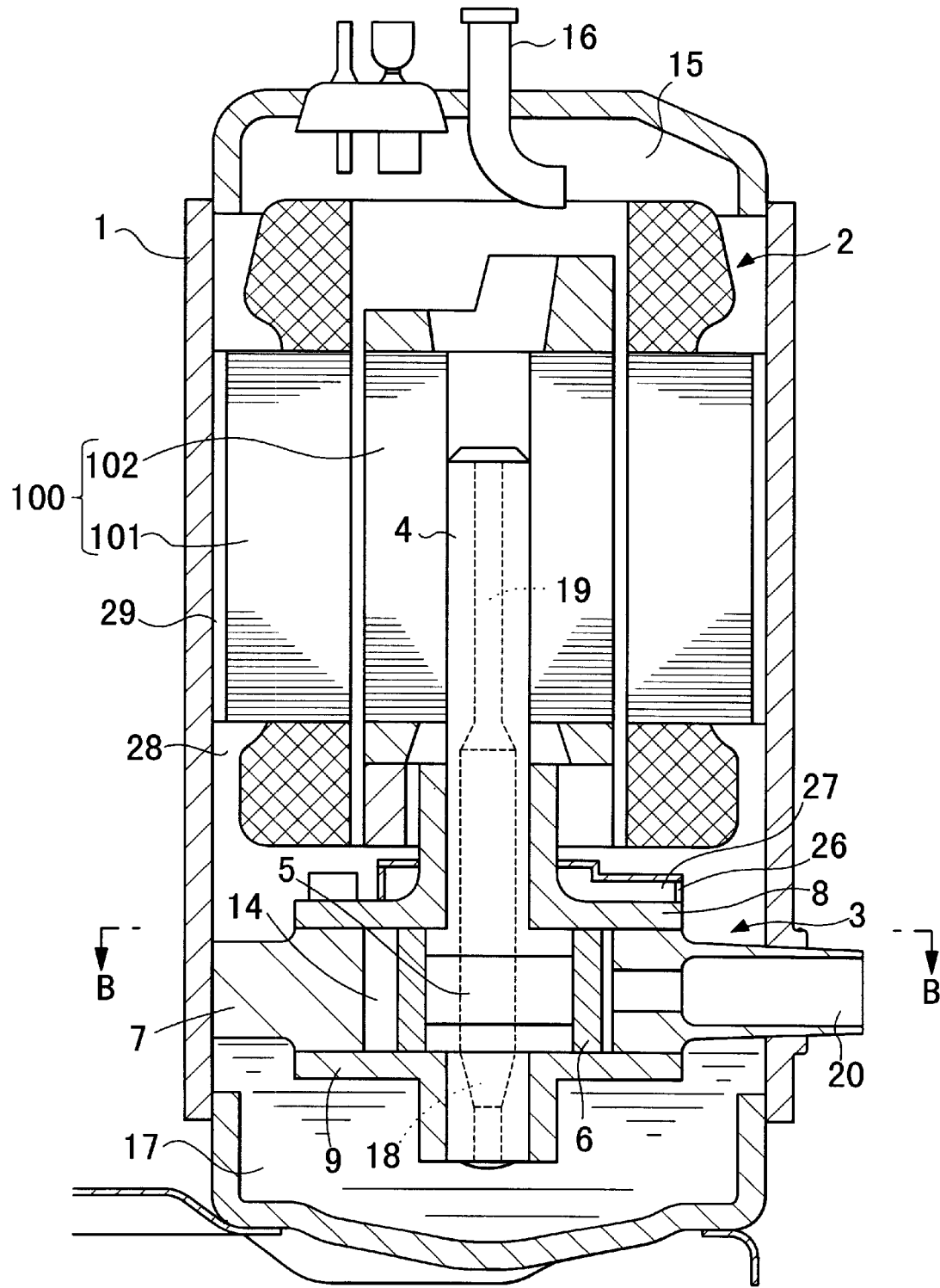
FIG. 3 is a vertical sectional view of a conventional closed type electric compressor.
Figure 4:
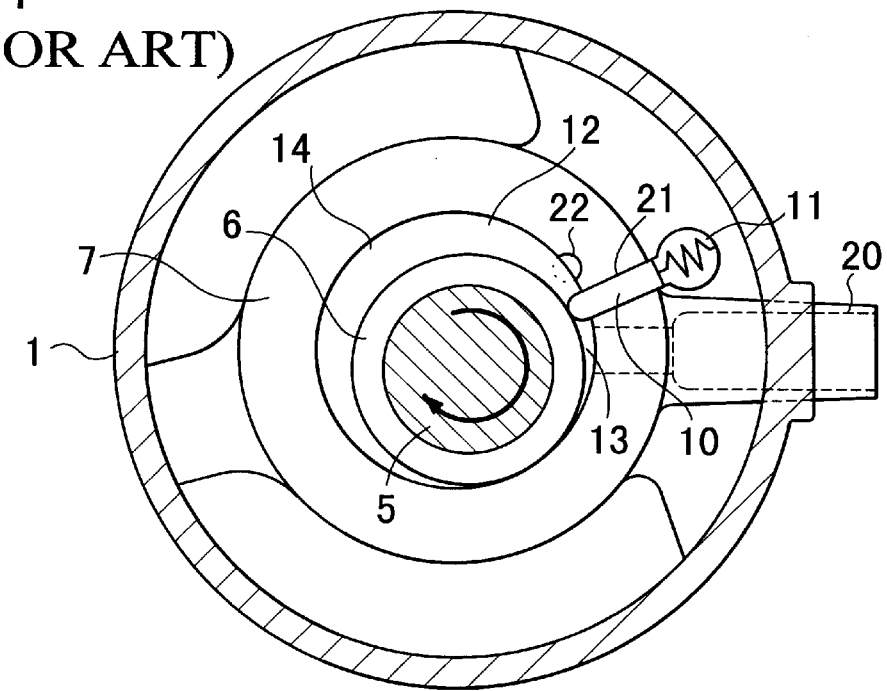
FIG. 4 is a sectional view taken along line B—B of FIG. 3.
Figure 5:
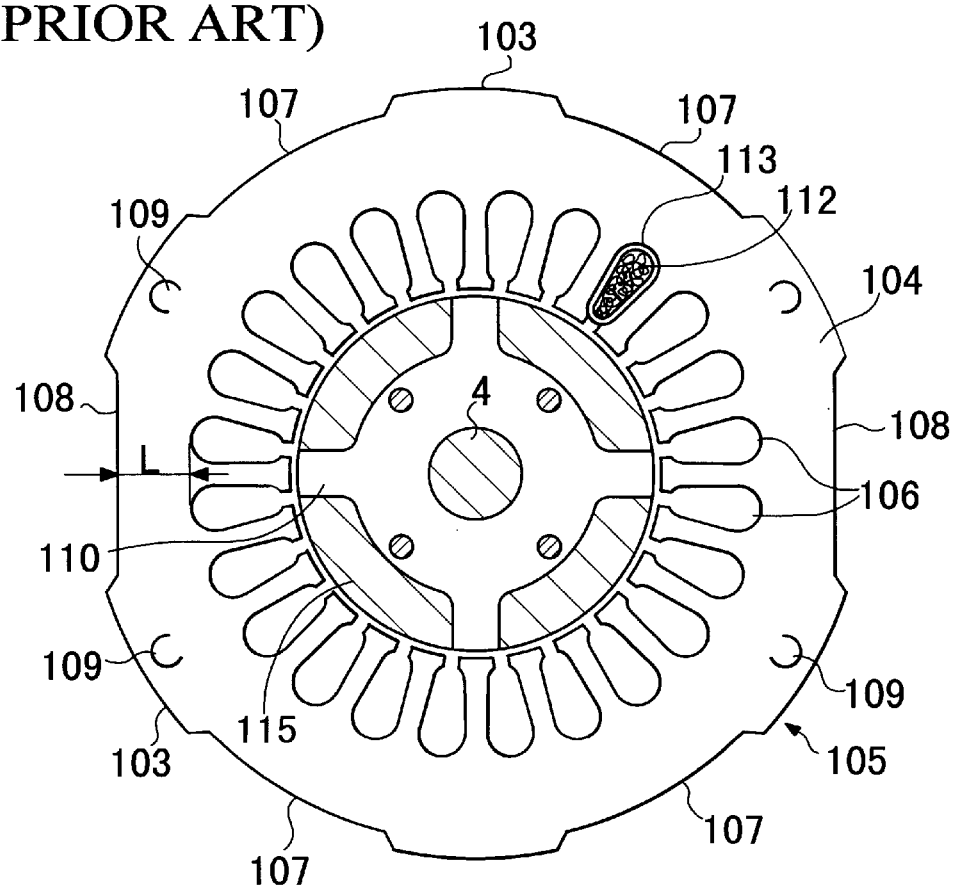
FIG. 5 is a vertical sectional view of a conventional motor.

FIGS. 1 and 2 are figures showing an embodiment of the present motor; FIG. 1 is a transverse sectional view (section taken along line C—C of FIG. 2) and FIG. 2 is a vertical sectional view.

A rotor 102 is provided with a cylindrical core 111 made up of a plurality of layered laminations 110 composed of thin silicon steel sheets with the same size and the same shape and a plurality of permanent magnets 115 are embedded circumferentially along the outer circumference of the core 111 and are equi-spaced.

Holding plates 116, 117 are arranged on and under the core 111, a crank shaft 4 is passed through the central parts thereof, and they are integrated by fastening rivets 114.

A stator 101 is provided with laminations 104 composed of a plurality of thin silicon steel sheets having the same size and the same shape, and the laminations 104 are layered one on top of the other aligned with recesses 109 for auto-clamping, and are integrated by caulking to constitute a cylindrical core 105.

The outer peripheries of the laminations 104 are formed with recesses 107 that define gas passages when they are incorporated into a closed type compressor and recesses 108 with which jigs for positioning are engaged at the time of layering of the laminations 104, and the recesses 107 and the recesses 108 (six in number in the figure) are equi-spaced circumferentially and constitute small-diameter sections. Large-diameter sections 103 are positioned between the adjacent recesses 107 and recesses 108 and are placed in forced contact with the inner surface of a casing of the closed type compressor.

The inner circumferential side of each of the recesses 107 and 108, that is, each of the small-diameter sections is formed with two small slots 121, and the inner circumferential side of each of the large-diameter sections is formed with two large slots 122.

Although the large slots 122 are the same as conventional slots 106, the diametrical length La of the small slots 12s is made shorter than the diametrical length Lb of the large slots 122, so that the yoke lengths L of all of the large slots 122 and the small slots 121 are made equal.

Moreover, if the width of the small slots 121 is made slightly larger than that of the large slots 122 to make the opening area of the small slots 121 approximately equal to the opening area of the large slots 122, the number of windings through the small slots 121 and the large slots 122 can be made approximately the same as the conventional one and hence the performance of the motor 100 can be prevented from lowering.

Thus, since the yoke length L of the small slots 121 and the yoke length L of the large slots 122 become approximately equal, when electricity is passed through the windings, the magnetic fluxes through the yoke lengths L become approximately the same and therefore the performance of the motor 100 is improved.

In this embodiment, since the diametrical length La of the small slots 121 is made shorter than the diametrical length Lb of the large slots 122 to make the yoke length of the small slots 121 approximately equal to the yoke length of the large slots 122, when electricity is passed through the windings, the magnetic fluxes through the yoke lengths become approximately the same and therefore the performance of the motor is improved.

Further, since a plurality of the recesses 107 and 108 are formed circumferentially with them approximately equi-spaced and the number of the small slots 121 positioned circumferentially inside of the recesses 107 and 108 and the number of the large slots 122 positioned circumferentially inside of the large-diameter sections 103 are made equal, the magnetic flux generated when electricity is passed through the windings can be distributed approximately uniformly throughout the laminations, and for this reason the performance of the motor can be improved.

What is claimed is:

1. A motor comprising:

a stator; and a rotor,
wherein the stator has a small-diameter section and a large-diameter section and is formed with a plurality of slots that are circumferentially spaced and through which windings are passed,
the stator has the following relationship:
La<Lb,
where La represents the diametrical length of the slots positioned circumferentially inside of said small-diameter section and Lb represents the diametrical length of the slots positioned circumferentially inside of said large-diameter section, and
the yoke lengths of said slots are made approximately equal.

2. The motor as claimed in claim 1, wherein a plurality of such small-diameter sections formed circumferentially with them approximately equi-spaced.

3. The motor as claimed in claim 1, wherein the opening areas of said slots are made approximately equal.

* * * * *